United States Patent
Ford et al.

[11] Patent Number: 5,900,983
[45] Date of Patent: May 4, 1999

[54] LEVEL-SETTING OPTICAL ATTENUATOR

[75] Inventors: Joseph E. Ford, Oakhurst; Keith Wayne Goossen, Aberdeen, both of N.J.

[73] Assignee: Lucent Technologies Inc., Murray Hill, N.J.

[21] Appl. No.: 08/916,859

[22] Filed: Aug. 22, 1997

[51] Int. Cl.⁶ .............. G02B 27/10; G02B 6/00; G02B 13/22
[52] U.S. Cl. .............. 359/627; 385/140; 359/663
[58] Field of Search .................. 359/627, 663; 385/140

[56] References Cited

U.S. PATENT DOCUMENTS 5,745,634   4/1998   Garrett et al. ............... 385/140

*Primary Examiner*—Hung Xuan Dang
*Assistant Examiner*—John Woolner

[57] ABSTRACT

A level-setting attenuator for generating an output signal having a predetermined optical power from an input optical signal having a varying power is disclosed. The level-setting attenuator includes a telecentric imaging device, a variable atttenuator, an optical power detector and control electronics. The telecentric imaging device collimates a received optical signal which is received and partially attenuated by the variable attenuator. In some embodiments, the variable attenuator generates an attenuated signal portion and an unattenuated signal portion. The attenuated signal is directed, by the variable attenuator, to an optical power detector operable to measure the power of the attenuated optical signal. The detector sends a signal indicative of the measurement to control electronics. The control electronics are operable to generate a control signal for controlling the attenuation of the unattenuated signal portion so that is has the predetermined power level. The unattenuated signal portion is coupled, via the telecentric imaging device, into an output fiber.

28 Claims, 6 Drawing Sheets

LEVEL-SETTING OPTICAL ATTENUATOR

STATEMENT OF RELATED APPLICATIONS

The present application is related to U.S. patent application Ser. No. 08/712,530 filed Sep. 11, 1996 entitled FOURIER PLANE PHOTONICS PACKAGE.

FIELD OF THE INVENTION

The present invention relates generally to optical attenuators. More particularly, the present invention relates to a variable optical attenuator that is operable to provide a controlled amount of transmitted optical power.

BACKGROUND OF THE INVENTION

Optical fiber-coupled components transmit digital or analog data over optical communications networks at time-varying power levels. Notwithstanding such variation, it is usually desirable for the average transmitted power to remain substantially constant. In the absence of such average power-level stability, problems relating to exceeding maximum or minimum input levels on other network components may arise. Moreover, significant power variations between multiple data channels can result in unacceptable levels of cross-talk therebetween. As network complexity increases, such as with the addition of active switching, e.g., wavelength add-drop and cross connect, the potential for problems relating to signal power variations increases.

Typically, intervention is required to maintain substantially constant average transmitted power levels. Such intervention is necessitated because average power transmitted by a given component will vary as a result of component degradation, changes in the fiber-coupling efficiency, or a change in input to the component. Intervention may be implemented as a system that includes an electrically-controlled variable optical attenuator used in combination with an optical signal monitor.

In a conventional implementation of the aforementioned system, a variable attenuator receives an optical input, attenuates the optical input, and delivers a portion of the received optical input. The delivered amount of signal is a function of the variable attenuator's then current attenuation setting. The delivered portion is received by an optical tap. Most of the delivered portion is transmitted by the optical tap to an output for delivery to subsequent network components. The signal transmitted to the output is the controlled quantity, and it is that signal that is delivered, under the best conditions, at a constant average power level. The small amount, e.g., about one percent, of the delivered portion that is not transmitted to the output is diverted to a detector. The detector measures the diverted portion. A signal indicative of the amount of the diverted portion is sent to control electronics. The control electronics send a signal to the variable attenuator, thereby resetting the previous attenuation setting, to increase or decrease attenuation to maintain constant average signal power out of the optical tap.

The aforedescribed conventional variable attenuator implementation thus requires at least three separate fiber-coupled components: a variable attenuator, an optical tap (such as a fused fiber coupler having one percent tap efficiency), and a fiber-coupled detector. The conventional implementation of the variable attenuator is thus relatively complex and expensive. It would be desirable to provide the art with a variable attenuator wherein all related components are integrated into a single device thereby providing cost savings, and reducing the size and complexity of the device.

SUMMARY OF THE INVENTION

An apparatus for a level-setting attenuator (LSA) is disclosed. The LSA includes a lens for collimating an optical signal received by the LSA. A variable attenuator, which can be embodied in a variety of ways, receives the collimated optical signal and attenuates it by a predetermined amount. The balance of the signal is directed to a lens for coupling into an output fiber.

In some embodiments, the attenuated portion of the signal is directed, by the variable attenuator, to an optical power detector. The detector is operable to measure the power of the attenuated portion of the optical signal. The detector sends a signal indicative of the measurement to control electronics. The control electronics are operable to calculate the power of the input optical signal. That information, in conjunction with the wavelength of the optical signal and the previous value of the attenuator control signal, is used to determine an attenuator control signal that provides a desired output optical signal power. The control electronics are further operable to send the attenuator control signal to the variable attenuator to reset, as appropriate, the attenuation provided by the variable attenuator, consistent with a desired output optical signal power.

Unlike conventional arrangements for achieving such controlled signal output power, the present LSA controls based on the attenuated portion of the signal and does not require fiber-coupled components.

BRIEF DESCRIPTION OF THE DRAWING

Further features of the invention will become more apparent from the following detailed description of specific embodiments thereof when read in conjunction with the accompanying Figures, in which:

FIG. 3a shows a first embodiment of the level-setting attenuator of FIG. 2a;

DETAILED DESCRIPTION OF THE INVENTION

The present invention is directed to a level-setting attenuator (LSA). The present LSA is an electrically-controlled optical fiber-coupled variable attenuator with an incorporated detector to measure the discarded (attenuated) portion of the input signal. The LSA uses the known properties of the variable attenuator to (i) calculate the transmitted optical power, and (ii) adjust the attenuator so as to transmit a specified output power regardless of fluctuations in input power. There are, however, limits to the ability of the present LSA to transmit a specified output power, as described below.

Figure 1:
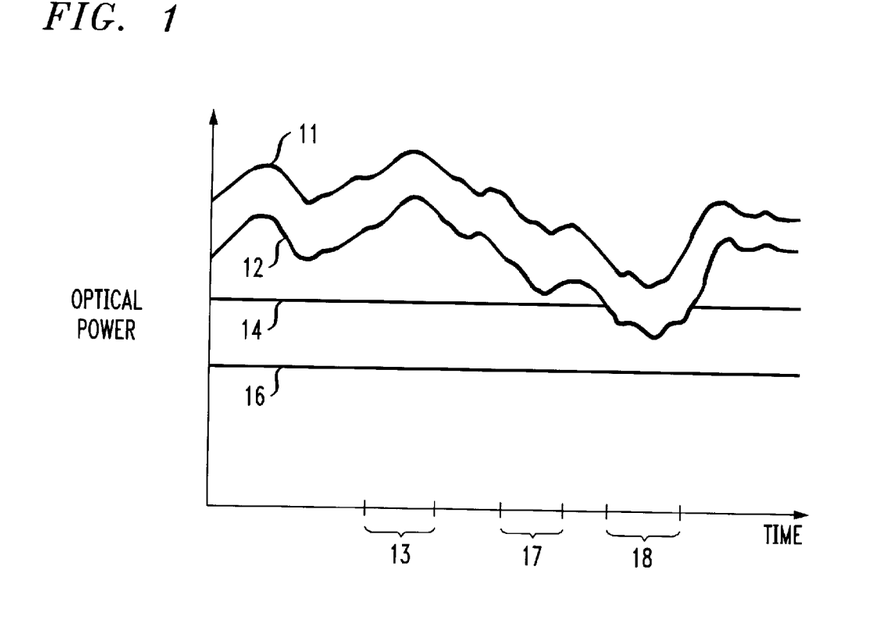
FIG. 1 illustrates the concept of time-varying input power and constant output power.

FIG. 1 illustrates how time-varying signal input may affect a component's ability to provide a constant average power output. Plot 11 shows optical power of an exemplary optical signal, which, for purposes of the present example, is the optical power carried on a fiber entering the LSA. Plot 12 shows the maximum power output achieveable by the LSA. Plot 12 is obtained by substracting the variable attenuator's "excess loss," which is the minimum attenuation possible for the variable attenuator, from plot 11.

Plots 14 and 16 represent two exemplary LSA output-power settings, $P_1$ and $P_2$, respectively. The output power setting $P_1$ represented by plot 14 is higher than the output power setting $P_2$ represented by plot 16. The desired output power setting $P_2$ shown in plot 16 is always less than the maximum achieveable power output from the LSA (plot 12). As such, the present LSA can be used to provide constant output power at the level $P_2$. This is accomplished by varying the signal attenuation in the attenuator. In particular, if the input power level rises, then attenuation increases to maintain the desired power output level, and, conversely, if the input power level drops, then attenuation is decreased. For example, attenuation occurring in the variable attenuator is greater during the time period 13 than during the time period 17.

Such constant output power is not achieved, however, at the power output setting $P_1$ shown in plot 14. For a time period 18, the desired output power for plot 14 exceeds the maximum achieveable power output from the LSA (plot 12). Thus, during the time period 18, input power fluctuations are revealed. The scenario described above with respect to plot 14 illustrates the limitations of the present LSA; under such circumstances, it cannot provide constant output power at the level $P_1$.

In a conventional optical fiber variable attenuator, an optical signal from an input fiber is typically expanded into a relatively large beam via a collimation lens. A variable portion of the light can then be blocked, e.g., reflected or absorbed, by an attenuating means and prevented from coupling into an output fiber. Typically, the blocked portion of light is discarded. If signal power level is to be maintained, then, in separate device, a small portion of the optical signal that is not blocked is sent, via a fiber-coupled optical tap, to a fiber-coupled optical power level detector. In contrast with a conventional arrangement for controlling a variable attenuator, the present LSA controls output power based on the blocked or attenuated portion of the signal. In some embodiments, such control is based on directing all, or a known fraction, of the blocked portion of light to an optical power level detector. An optical tap is not required, and the optical power level detector is not fiber coupled.

Figure 2A:
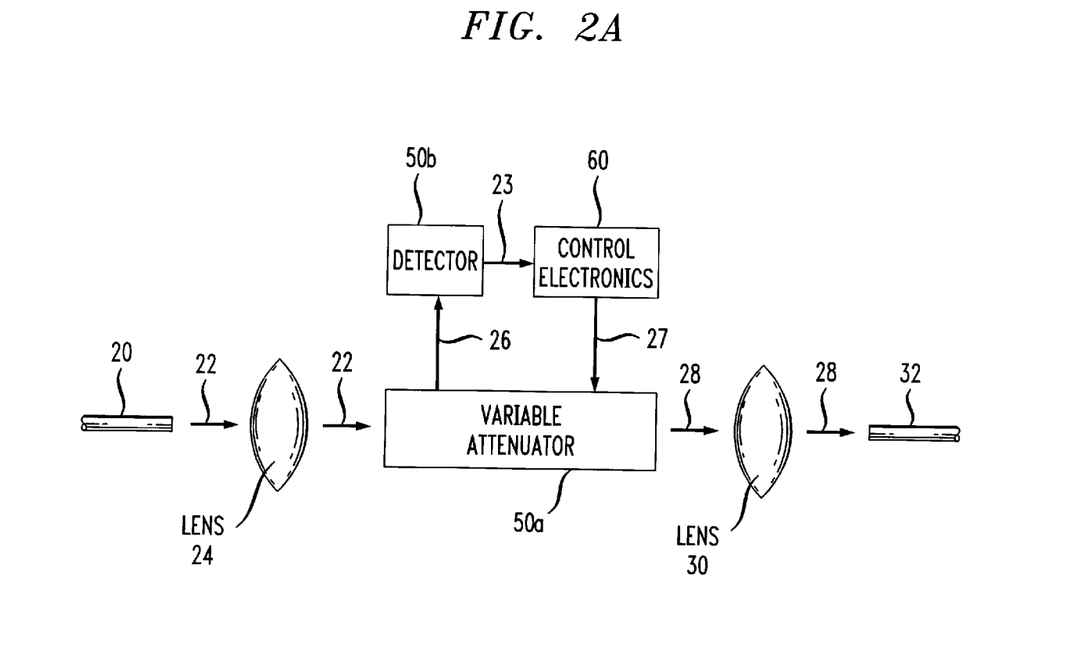
FIG. 2a shows a level-setting attenuator according to the present invention utilizing a transmissive geometry.
Figure 2B:
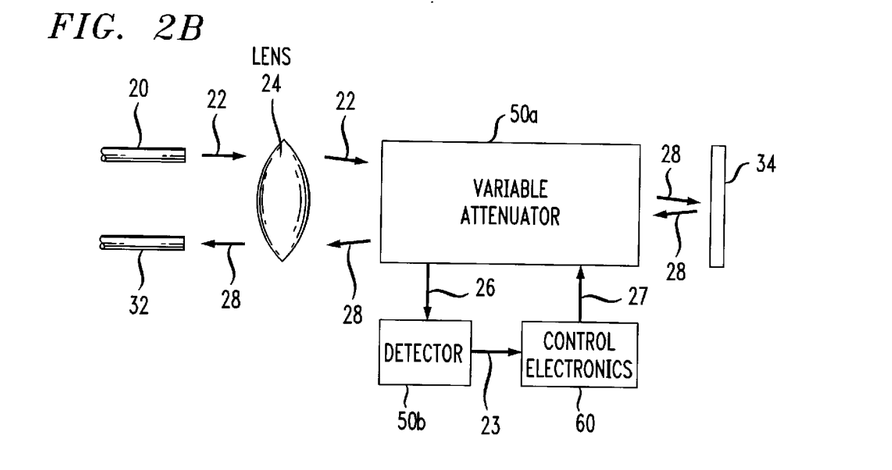
FIG. 2b shows a level-setting attenuator according to the present invention utilizing a reflective geometry.

The present LSA is configurable in either a transmissive or reflective geometry, as conceptually illustrated in FIGS. 2a and 2b, respectively. FIG. 2a shows an input fiber 20 for delivering an optical signal 22 to lens 24. Lens 24 collimates and expands the optical signal 22 for delivery to an optical variable attenuator 50a. The variable attenuator 50a attenuates the optical signal 22 by a variable predetermined amount, and directs some or all of an attenuated signal portion 26 of the signal 22 to an optical detector 50b. A portion 28 of the optical signal 22 that is not attenuated ("the output signal") is received by a lens 30 that couples it into an output fiber 32.

A detector 50b measures the attenuated signal portion 26 of the optical signal 22. A signal 23, typically an electrical signal, indicative of the detector measurement is provided to control electronics 60. The control electronics 60 calculate the power of the output signal 28 using information from the signal 23 and information pertaining to the variable attenuator. The control electronics 60 then generate and send a control signal 27, typically an electrical signal, to the variable attenuator 50a to adjust its attenuation level, as appropriate, to provide a desired power level of output signal 28. The control electronics 60 include, among other elements, a microprocessor and computer readable-storage means. The implementation of such a feedback control system employing control electronics is within the capabilities of those skilled in the art. Description of a preferred embodiment for controlling the present LSA is provided later in this specification.

An embodiment of the present LSA implemented with a reflective geometry is shown in FIG. 2b. That exemplary embodiment includes input fiber 20 for delivering the optical signal 22 to the lens 24. As in the previous embodiment, the lens 24 collimates and expands the optical signal 22 for delivery to the optical variable attenuator 50a. The output signal 28 is received by a mirror 34 that reflects the output signal 28 back through the attenuator 50a and to the lens 24. The lens 24 receives the output signal 28, which is still collimated, and focuses it so that it couples into output fiber 32.

As in the previously-described transmissive configuration, the detector 50b measures the attenuated signal portion 26 of the optical signal 22, and sends a signal 23 indicative of such measurement to control electronics 60. Again, the control electronics calculate the power of the output signal 28, and generate and send a control signal 27 to the variable attenuator 50a to adjust its attenuation level, as appropriate, to provide a substantially constant output signal 28.

In the LSA shown in FIG. 2b, which is configured with a reflective geometry, the optical signal 22 is received by the variable attenuator 50a before it is received by the mirror 34. In other embodiments employing a reflective geometry, the optical signal 22 may be received by the mirror 34 before being received by the variable attenuator 50a.

Lenses suitable for use as the lenses 24 and 30 include, without limitation, graded index (GRIN) lenses, ball lenses and molded lenses, such as, for example, injection molded lenses. In a presently preferred embodiment, the lenses 24 and 30 are quarter-pitch GRIN lenses. As will be appreciated by those skilled in the art, a quarter-pitch GRIN lens is the shortest length GRIN lens that will substantially collimate an optical signal.

In preferred embodiments, the present LSA is configured for telecentric imaging. A telecentric imaging system is one in which the entrance pupil and/or exit pupil is located at infinity. See, Smith, *Modern Optical Engineering,* Chapter 6, Sect. 6, (McGraw-Hill, 1990). In the context of the present invention, either for a reflective or transmissive geometry, telecentricity means that the output optical signal 28 incident on the output fiber 32 will match both spatial location and the optimum incidence angle for the output fiber, resulting in highly efficient coupling.

A collimated beam entering a lens, such as the lens 30, is focused to a point on a surface located at the Fourier plane. See, Goodman, *Introduction to Physical Optics*, Chapter 5, "Fourier Transforming and Imaging Properties of Lenses," (McGraw-Hill, 1968) for a mathematical definition. The Fourier plane is the back focal plane of a lens. For a transmissively-configured LSA as shown in FIG. 2a, such telecentric imaging requires two lenses separated by the sum of their back-focal distances and that the output fiber 32 is disposed at the focal plane of the nearest lens. Thus, collimated light entering the lens 30 will be focused at a point at the output fiber 32.

For a reflective geometry, such telecentric imaging requires that a mirror, such as the mirror 34, that reflects the output signal 28 towards the output fiber 32, is placed at the Fourier plane. In addition, the output fiber 32 is also located at a focal plane. Thus, by disposing the mirror 34 in the Fourier plane, as described above, and making two passes through the lens 24, a telecentric optical system is again created.

FIGS. 3a–3d shows several embodiments of the attenuator 50a and optical detector 50b and the manner in which they are incorporated into the present LSA.

Figure 3A:
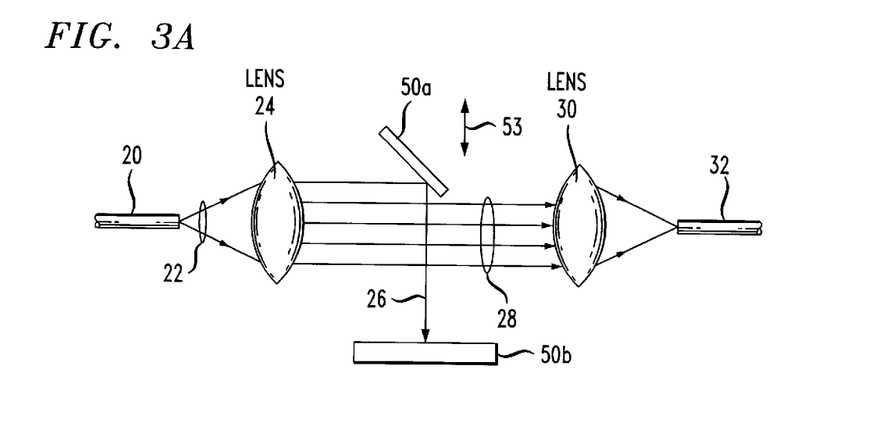

In the exemplary embodiment of the present LSA shown in FIG. 3a, the variable attenuator 50a is a movable mirror and the detector 50b is a large area photodetector. Photodetectors suitable for use in conjunction with this and other embodiments of the present invention include, without limitation, photoconductors, photodiodes, avalanche photodiodes, phototransistors, heterojunction photodiodes, P-I-N multiple quantum well detectors and metal-insulator insulator III-V photodiodes. The operation and fabrication of such photodetectors are known to those skilled in the art and will not be described herein.

The movable mirror 50a is movable in the directions indicated by direction vector 53. Attenuation is increased as the movable mirror 50a is moved further into the path of the optical signal 22, i.e., moved downwardly in FIG. 3a, so that an increasing amount of the optical signal 22 is incident upon and reflected by the movable mirror 50a. Attenuation is decreased as the movable mirror 50a is moved out of the path of the optical signal 22. The attenuated signal portion 26 of the optical signal 22 is reflected by the movable mirror 50a to the large area photodetector 50b. As previously described, the detector 50b measures the power of the attenuated signal portion 26. A signal indicative of the detector measurement is provided to control electronics, not shown, which calculate the power of the output signal 28 and send a control signal to the variable attenuator 50a to adjust its attenuation level, as appropriate, to provide a constant output signal 28.

Figure 3B:
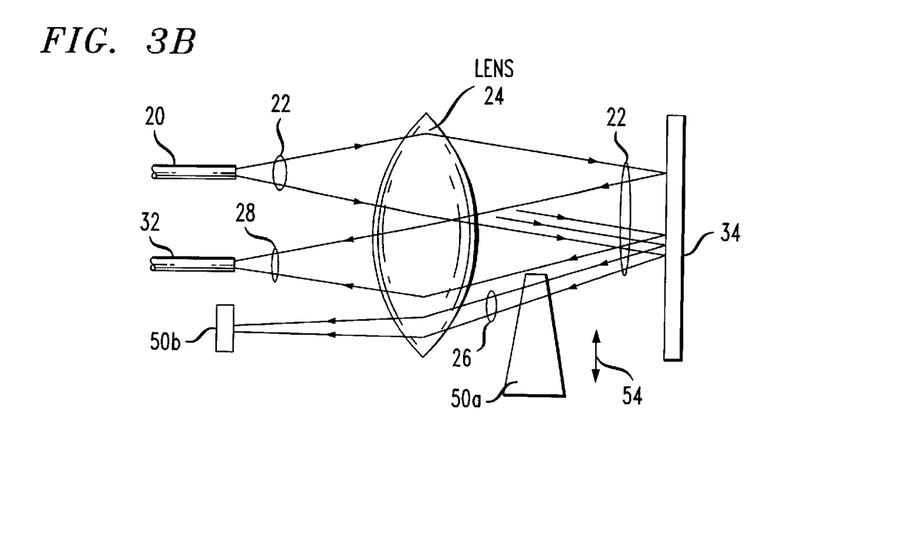
FIG. 3b shows a first embodiment of the level-setting attenuator of FIG. 2b.
Figure 3C:
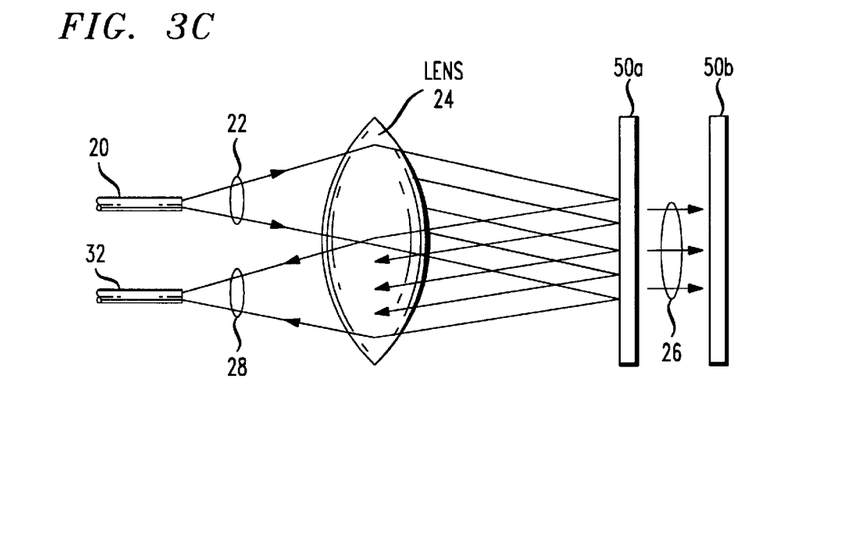
FIG. 3c shows a second embodiment of the level-setting attenuator of FIG. 2b.
Figure 3D:
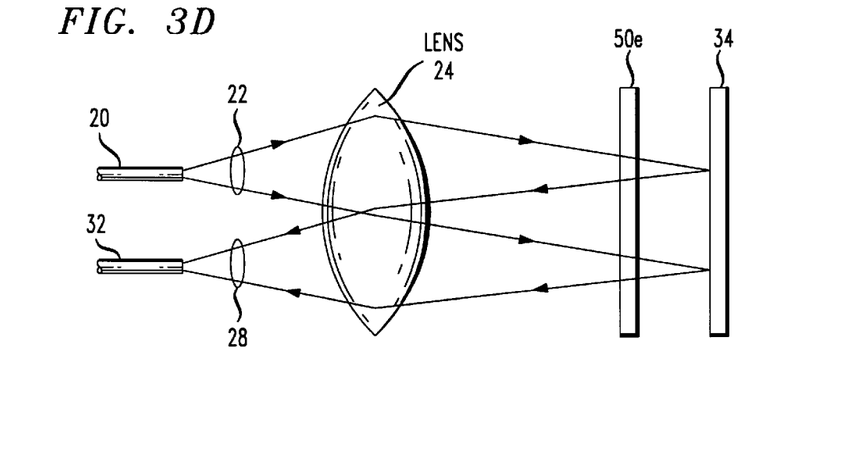
FIG. 3d shows a third embodiment of the level-setting attenuator of FIG. 2b.

The exemplary LSA shown in FIG. 3a utilizes a transmissive geometry. It should be understood, however, that a variable attenuator 50a embodied as a movable mirror can be used in conjunction with an LSA configured with a reflective geometry. FIGS. 3b–3d show three additional exemplary embodiments of variable attenuators suitable for use in conjunction with the present LSA. In contrast to the exemplary LSA shown in FIG. 3a, the LSAs shown in FIGS. 3b–3d employ a reflective geometry.

In FIG. 3b, the variable attenuator 50a is embodied as a movable wedge-shaped prism, and the detector 50b is a small-area photodetector. The movable wedge-shaped prism 50a is movable in the directions indicated by direction vector 54. Attenuation is increased as the movable wedge prism 50a is moved further into the path of the optical signal 22, i.e., moved upwardly in FIG. 3b, so that an increasing amount of the optical signal 22 is received by the movable wedge-shaped prism 50a. Attenuation is decreased as the movable wedge-shaped prism 50a is moved out of the path of the optical signal 22.

Thus, the optical signal 22 is collimated by lens 24 and reflected by a mirror 34 back towards the lens 24. A predetermined portion of the optical signal 22 is received by the movable wedge prism 50a either in a forward or backward path, or both. That received predetermined portion is the attenuated portion of the signal 22. The prism 50a refracts the attenuated signal portion 26 towards the small-area photodetector 50b. As above, the photodetector 50b measures the power of the attenuated signal portion 26, communicates that measurement to control electronics, not shown, which calculate the power of the output signal 28 and send a control signal to the variable attenuator 50a to adjust its attenuation level, as appropriate, to provide a constant output signal 28.

In FIG. 3c, the variable attenuator 50a is a variable reflectivity mirror (VRM). After the optical signal 22 is collimated by the lens 24, it is received by the VRM 50a. Attenuation increases as mirror reflectivity decreases, and vice versa. The attenuated signal portion 26 passes to a large-area photodetector 50b disposed downstream of the VRM 50a. Again, the photodetector 50b measures the power of the attenuated signal portion 26, communicates that measurement to control electronics. The control electronics calculate the power of the output signal 28 and send a control signal to the variable attenuator 50a to adjust its attenuation level, as appropriate, to provide a constant output signal 28.

The VRM can be, without limitation, a micromechanical optical modulator. Micromechanical optical modulators suitable for use in conjunction with the present invention are described in U.S. Pat. Nos. 5,500,761; 5,589,974; 5,636,052; and 5,654,819 and U.S. patent applications Ser. No. 08/578123 filed Dec. 26, 1995, Ser. No. 08/565453 and Ser. No. 08/597003.

Figure 4:
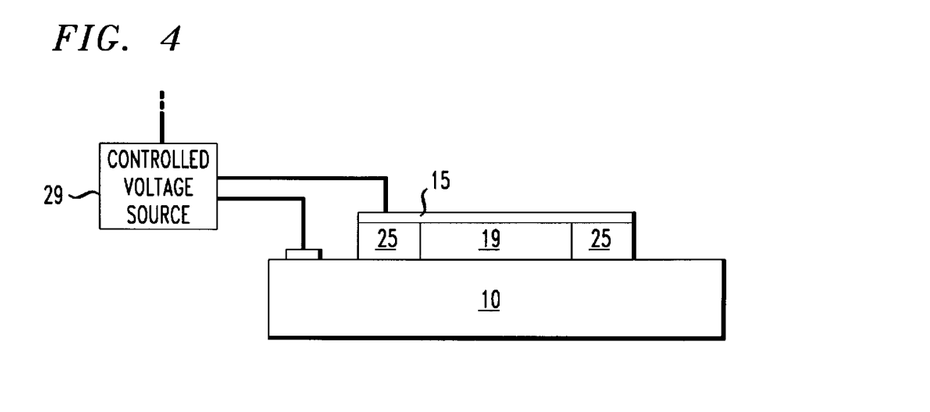
FIG. 4 shows an embodiment of a variable reflectivity mirror for use with the present invention.

The aforementioned VRMs are typified by a configuration, illustrated in FIG. 4, wherein a movable layer or membrane 15 is spaced, via a support 25, from a nonmoving layer 10 defining a gap 19 therebetween. A voltage, such as may be delivered from a controlled voltage source 29, is applied to the movable layer 15 and the nonmoving layer 10 generating an electrostatic force. The electrostatic force causes the movable layer 15 to move between a first position (maintained in the absence the applied voltage) and a second position closer to the nonmoving layer. As the movable layer 15 moves from the first position, the reflectivity of the VRM changes. Thus, changing the position of the movable layer 15 changes the amount of optical signal attenuation.

The movable layer 15 comprises one or more sublayers of materials, wherein the number of sublayers and their characteristic properties, e.g., refractive index, thickness, may provide different operating characteristics to the VRM. In preferred embodiments, the VRM has a "drum-head" membrane, as described in U.S. patent application Ser. No. 08/565453 referenced above, and further, the movable layer 15 comprises three sublayers having specified refractive indices and thickness, as described in U.S. Pat. No. 5,654,819.

Unless otherwise noted in the aforementioned patent applications, the usual operating mode for the VRMs is as follows. Relative reflectivity maxima are encountered when the gap 19 is equal to odd integer multiples of one-quarter of a wavelength of the incident optical signal (at the design wavelength of the VRM), i.e., $m\lambda/4$ where m=1, 3, 5 .... Furthermore, such VRMs will exhibit relative reflectivity minima when the gap 19 is 0 or an even integer multiple of one-quarter of the operating wavelength, i.e., $m\lambda/4$ where m=0, 2, 4.

In a preferred embodiment, the VRM 50a and photodetector 50b shown in FIG. 3c are combined or integrated. One such combined VRM and photodetector is described in a U.S. Patent Application entitled "METHOD AND ARRANGEMENT FOR A COMBINED MODULATOR PHOTODETECTOR," filed on Jul. 5, 1996 as Ser. No. 08/675980. In that application, the VRM is a micromechanical optical modulator. Though the operation of the combined modulator photodetector, as described in that Ser. No. 08/675980, differs, in some respects, from the manner in which it is is operated herein, the structures disclosed therein are suitable for use in conjunction with the present invention.

Figure 5:
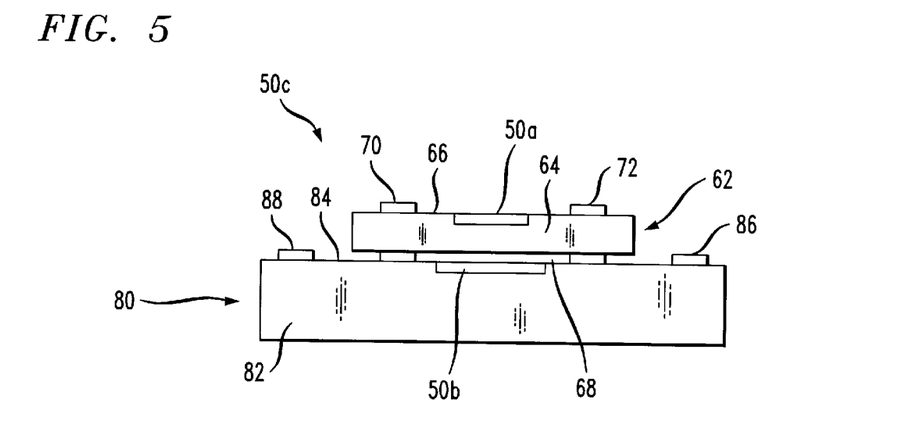
FIG. 5 shows a first embodiment of a combined variable reflectivity mirror and optical detector for use in conjunction with the present invention.

An exemplary combined VRM/photodetector 50c is illustrated in FIG. 5. The exemplary combined VRM/photodetector 50c consists of a VRM chip 62 attached to a photodetector chip 80. The VRM chip 62 includes a substrate 64 having a first surface 66 and a second surface 68. Preferably, the substrate 64 is silicon, but, as will be appreciated by those skilled in the art, other materials substantially transparent at the operating wavelengths may suitably be used. A VRM 50a is located along the first surface 66 of the substrate 64. The VRM 50a is placed in electrical contact with a controlled voltage source, not shown, via contacts or wire bond pads 70 and 72. The VRM 50a can suitably be embodied as the micromechanical optical modulators described and referenced above.

The photodetector chip 80 includes a III-V substrate 82 having a first surface 84. The III-V substrate 82 is preferably indium phosphide (InP) for optical communications applications, but may suitably be other III-V semiconductors, such as gallium arsenide (GaAs) in other embodiments. A detector 50b is located along the first surface 84 of the III-V substrate. The detector 50b can suitably be embodied, for example, as any of the photodetectors listed earlier in this specification. The photodetector chip 80 is electrically connected to the control electronics 60, not shown, previously described. Such electrical connection is provided via contacts or wire bond pads 86 and 88.

In operation, the combined VRM/photodetector 50c receives the optical signal 22 collimated by lens 24. The VRM 50a is placed in at least partially transmissive mode so that a portion of the optical signal 22 is transmitted through the VRM 50a to the photodetector 50b. The transmitted portion is the attenuated signal portion 26. As in previous embodiments, the photodetector measures the power of the attenuated signal portion 26 and sends a signal representative thereof to control electronics, not shown, and control electronics sends a control signal to reset the attenuation of the VRM 50a.

A second combined VRM and photodetector is described in a U.S. Patent Application entitled "WAFER-LEVEL-INTEGRATION OF AN OPTICAL MODULATOR AND III-V PHOTODETECTOR," filed on Jul. 23, 1996 as Ser. No. 08/685294.

Figure 6:
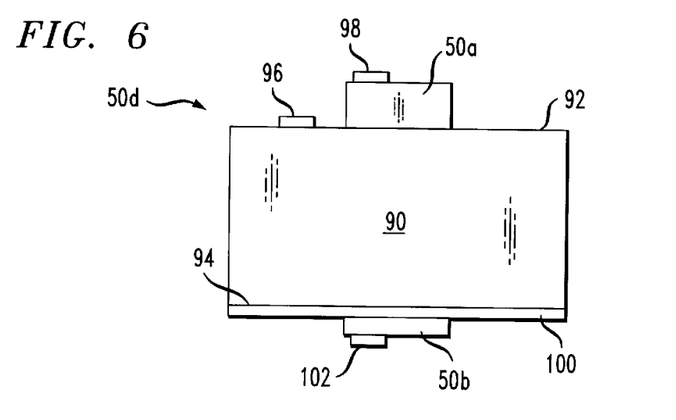
FIG. 6 shows a second embodiment of a combined variable reflectivity mirror and optical detector for use in conjunction with the present invention.

An exemplary wafer-level integrated (WLI) VRM/photodetector 50d is shown in FIG. 6. The WLI VRM/photodetector 50d includes a variable reflectivity region 50a and a photodetection region 50b that are formed on opposed surfaces 92 and 94, respectively, of an off-axis silicon substrate or wafer 90. The variable reflectivity region 50a can suitably be embodied as the micromechanical optical modulators described and referenced above. A first and second wire from a controlled voltage source, not shown, are bonded to bond pads or contacts 96 and 98 to place the controlled voltage source in electrical connection with the variable reflectivity region 50a.

In a preferred embodiment, the photodetection region 50b is disposed on a buffer layer 100 situated on the surface 94 of the wafer 90, rather than directly on the surface 94. The buffer layer 100 provides a lattice-mismatch relaxation region between the first III-V layer, typically InP in communications applications, and the off axis substrate 90. The detection region 50b can suitably be embodied, for example, as any of the photodetectors listed earlier in this specification. The photodetection region 50b is in electrical communication with the control electronics 60, not shown, previously described. A surface contact 102 is provided for this purpose; the other contact can be to the substrate 90.

The WLI optical modulator/photodetector 50d operates in substantially the same manner as the combined optical modulator/photodetector 50c.

The use of such combined and wafer-level-integrated modulator/photodetector packages in other similarly-configured photonic apparatuses is disclosed in a U.S. Patent Application for a "FOURIER PLANE OPTICAL DETECTOR PACKAGE," filed Sep. 11, 1996 as Ser. No. 08/712530.

With continuing reference to embodiments of the variable attenuator 50a, a fourth such embodiment is shown in FIG. 3d. In the exemplary embodiment shown in FIG. 3d, the functions of the variable attenuator 50a and the photodetector 50b are combined in a variable absorber and detector (VAD) 50e. Such a device is described in a U.S. Patent Application for a "SMART PIXEL ARRAY USING SINGLE DIODE FOR DETECTION AND MODULATION," filed Jan. 17, 1996 as Ser. No. 08/588155. The VAD 50e, illustrated in FIG. 7 comprises an indium gallium arsenide (InGaAs) quantum well stack 106 disposed on a first surface 110 of an indium phosphide substrate 104. An antireflection coating 108 is disposed on a second surface 112 of the substrate 104.

Figure 7:
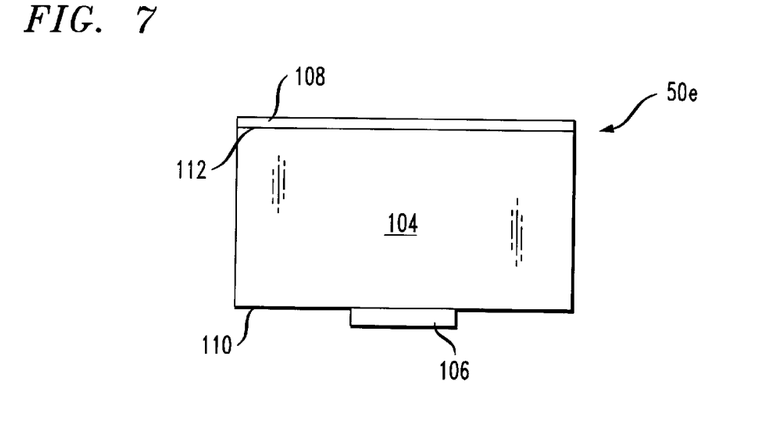
FIG. 7 shows an exemplary embodiment of a variable absorber-detector for use in conjunction with the present invention.

The VAD 50e becomes absorptive under a bias voltage. As such, attenuation within the VAD 50e is controlled by applying a voltage thereto. As the optical power incident upon the VAD 50e varies, the voltage is varied to maintain a desired amount of attenuation. The current associated with such voltage is used to measure the incident optical power. A signal representative of such optical power is sent to control electronics 60, which then set bias voltage for appropriate attenuation.

With continuing reference to FIG. 3d, a fixed mirror 34 is disposed behind the VAD 50e. The VAD 50e is biased, responsive to the control electronics, to absorb a portion of the optical signal 22, i.e., the attenuated signal portion, and transmit the balance of the optical signal 22, i.e., the output signal 28. The output signal 28 is received by the mirror 34 and is reflected back through the VAD 50e, to the lens 24, and is imaged into the output fiber 32.

Control electronics, such as the control electronics 60, for setting the attenuation of the variable attenuator, require information about the optical properties of the variable attenuator 50a and the response of the detector 50b. The optical behavior of an LSA is characterized by an optical transfer function, which expresses the power coupled into the output fiber, such as the fiber 32, as a function of the input power level $p^{in}$, the wavelength $\lambda$ of the optical signal, and the attenuator control signal X The electrical behavior of the LSA is characterized by the detector response, which is the electrical output of the detector as a function of the input power level $P_{in}$, the wavelength $\lambda$ of the optical signal, and the attenuator control signal X Using such information, an appropriate attenuation setting for the control signal can be computed.

One method for computing such an attenuation setting is to use a look-up table. In other words, for any particular combination of input wavelength, detector signal and control setting, there is an associated value for the input power level. Knowing that value, the appropriate value for the control signal X that produces the desired output can then be looked up. Such a table may be stored in any type of computer-readable storage medium.

In some cases, the wavelength of the optical signal being attenuated is not known. Moreover, the signal may be polychromatic. As such, it is desirable for the optical impulse response and the detector response to have no dependence on wavelength.

If the optical transfer function of the LSA and the detector response are known analytically, it is possible to compute the appropriate attenuator control settings analytically. As an example, an LSA with an optical transfer function that is independent of wavelength and linear in response to the attenuator control signal may be expressed as:

$$P_{out}(P^{in},\lambda,X) = K_1 P^{in}(1-X), \qquad [1]$$

where $P_{out}$ is the output power of the LSA and $K_1$ is a constant having a value less than one.

Further, a detector having output signal $S_{det}$ that is independent of wavelength and linear in response to the input power level may be expressed as:

$$S_{det}(P^{in},\lambda,X) = K_2 P^{in} X, \qquad [2]$$

where $K_2$ is a constant.

The input power $P^{in}$ can be calculated from the detector signal and current attenuator control signal as:

$$P^{in} = S_{det}/(K_2 X) \qquad [3]$$

Substituting expression [3] into expression [1] and solving for $X$ yields an expression for the appropriate control signal $X_{set}$ required for achieveing a desired power output level $P_{set}$:

$$X_{set} = K_1 S_{det}/(K_1 S_{det} + K_2 P_{set}) \qquad [4]$$

It is difficult if not impossible to build a variable attenuator 50a having a perfectly linear response to a direct mechanical or electrical signal. An alternative, however, is to provide an analog control circuit for linearizing any given attenuator response and for linearizing the output for any detector with a non-uniform response to input power. Such a circuit can be readily implemented by those having ordinary skill in the art. Once such a circuit is available, the control expressions [1]–[4] provided above can be used.

Figure 8:
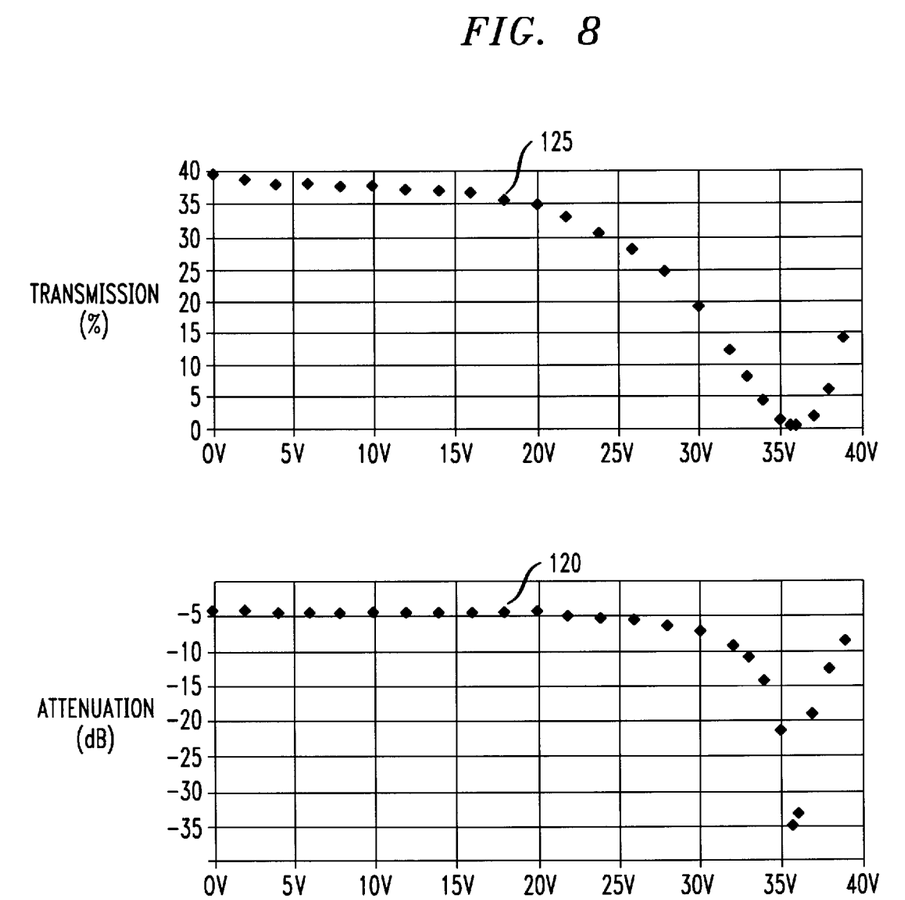
FIG. 8 shows attenuation as a function of applied voltage for a particular variable attenuator.

FIG. 8 shows optical signal attenuation 120 measured as a function of applied voltage for an LSA utilizing a VRM 50a embodied as a micromechanical optical modulator such as disclosed in U.S. Pat. No. 5,654,819. The micromechanical optical modulator described therein exhibits wavelength independence over a broad range of wavelengths and is preferred for use in conjunction with the present invention. That modulator is configured substantially as shown in FIG. 3c.

The broad operating bandwidth of the aforementioned modulator is realized using a movable layer comprised of three sublayers. An uppermost (furthest from the nonmoving layer 10) third sublayer has a refractive index that is approximately equal to the refractive index of the nonmoving layer and a thickness approximately equal to one-half of a wavelength of the optical signal as measured within the third sublayer; a second middle sublayer has a refractive index that is approximately equal to the square root of the refractive index of the nonmoving layer and a thickness approximately equal to one-quarter of a wavelength of the optical signal as measured within the second sublayer; and a third lowermost sublayer of the movable layer (closest to the nonmoving layer 10) has a refractive index that is approximately equal to the refractive index of the nonmoving layer and a thickness approximately equal to one-quarter of a wavelength of the optical signal as measured in the first layer. While modulator transmissivity 125 is a non-linear function of input voltage, it is single-valued and monotonic over the range of use (0 to 36 volts), so that control of such response can be linearized.

In some embodiments, the optical coupling efficiency and/or detector sensitivity of the present LSA exhibits a fixed (non-varying) wavelength dependence. In such embodiments, custom transmission filters can be used to compensate for such wavelength dependence by tailoring the desired transmission as a function of wavelength. Such filters can be fabricated using a multi-layer dielectric coating deposited onto a planar substrate, and by recording a holographic filter into a segment of optical fiber. The fabrication of such filters is known to those skilled in the art.

Thus, if the fiber-coupled insertion loss of an LSA according to the present invention has a measured dependence on wavelength, then a custom correction filter can be designed and added and will exactly eliminate wavelength dependence. In one embodiment, the correction filter can be added as a dielectric coating on the end of the collimation lens 24. In another embodiment, the correction filter can be implemented as a stand-alone optical filter disposed downstream of the collimation lens 24 (so that it receives a collimated signal). Also, the filter can be added to the optical fiber entering or leaving the LSA as, for example, a fiber diffraction grating. Locating the filter in the optical fiber can, however, result in unacceptably large backreflections. Such backreflections can be minimized by designing the fiber grating filter to scatter part of the signal out of the fiber-guided mode.

It should be appreciated that such fixed wavelength correction filters can not compensate for a time-varying wavelength dependence. Thus, if the variable attenuator has a wavelength dependence that changes as the control signal (and the attenuation) is varied, then a fixed dielectric filter can only approximately compensate. Similarly, if the detector sensitivity changes as a function of the incident power, then the fixed dielectric filter can only approximately compensate for the average wavelength dependence.

Figure 9:
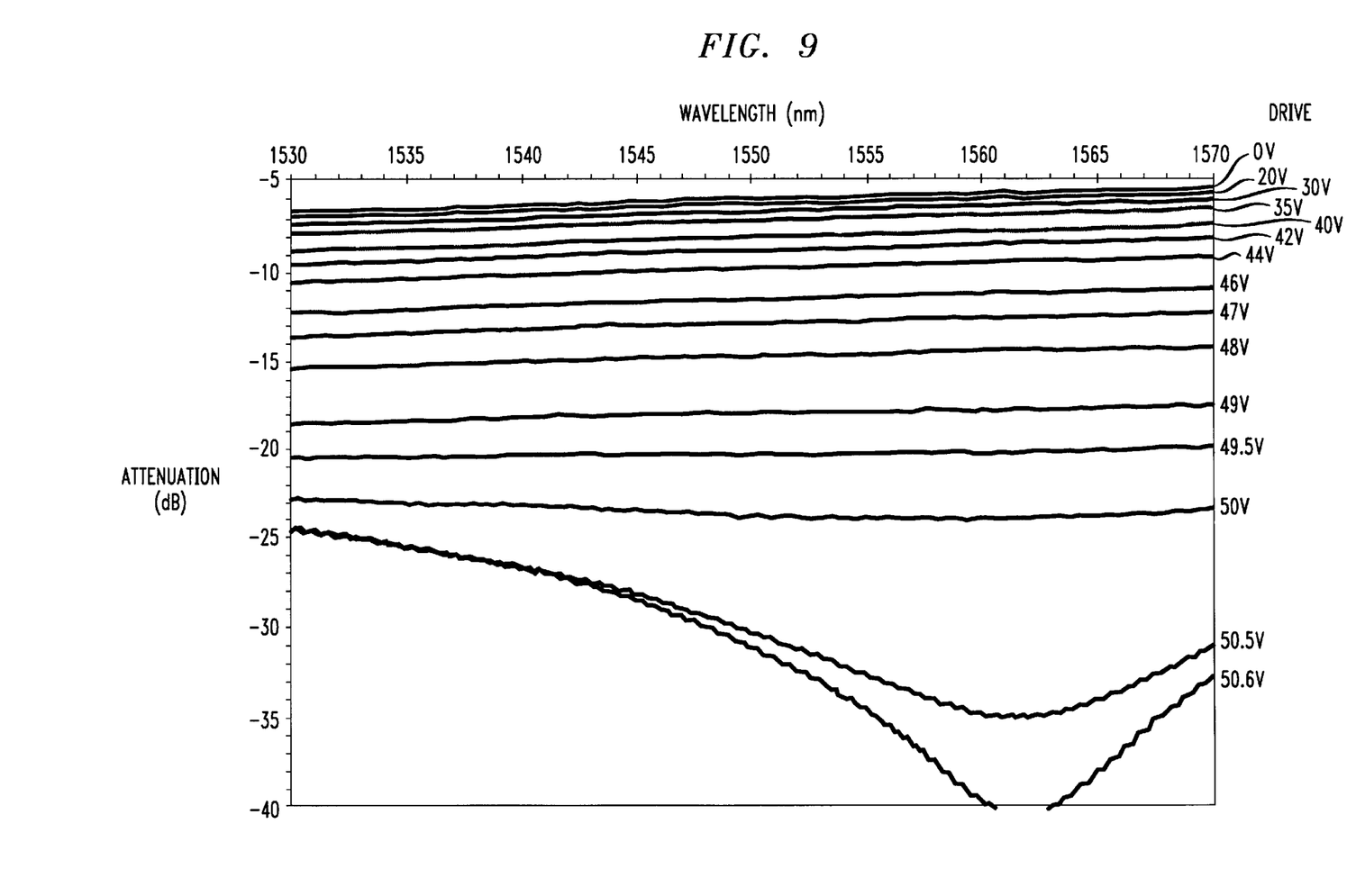
FIG. 9 shows the spectral response of the variable attenuator characterized in FIG. 4.

FIG. 9 shows the attenuation provided by the VRM described with reference to FIG. 8 as a function of the control voltage X Attenuation shows a linear dependence on input wavelength, changing by about 2 dB over the range of 1530 to 1570 nm. This wavelength dependence does not change, however, as the attenuation is increased by about 20 dB, indicating that a fixed dielectric filter could adequately compensate for the attenuator response over this range.

Although specific embodiments of this invention have been described herein, it is to be understood that these embodiments are merely illustrative of the principles of this invention. Numerous and varied modifications may occur to, and be implemented by, those of ordinary skill in the art in view of the present teachings without departing from the scope and the spirit of the invention. For example, a VRM could be used in place of the constant reflectivity mirror in the embodiment illustrated in FIG. 3a. Rather than moving into, or out of, the path of the optical signal, the VRM is placed fully in the path of the optical signal and tilted at an angle. VRM reflectivity is controlled to provide that desired amount of signal attenuation. For example, to provide a small amount of attenuation, the VRM is placed in a relatively low reflectivity state so that a relatively minor portion of the optical signal is reflected toward the detector 50b. In the context of FIG. 3a, that minor reflected portion is the attenuated signal portion 26. The balance of the incident optical signal 22 is transmitted through the VRM and is coupled, via the lens 30, into the output 32.

It will be appreciated that the disclosed implementations of variable attenuators, and other implementations as well, can be arranged, in conjunction with optics, in numerous ways consistent with the present teachings.

We claim:

1. An article for controlling the attenuation of an input optical signal having a time-varying power to provide an output optical signal having a desired power, comprising:
   an attenuating device operable to variably attenuate the input optical signal by generating an attenuated signal portion and the output optical signal, and separating said attenuated signal portion from the output optical signal;
   a coupling device that couples the output optical signal to an output;
   a first generating device that generates a first signal indicative of the amount of optical power attenuated; and
   a second generating device that generates a second signal for resetting the variable amount of attenuation so that the output optical has the desired power, wherein the second signal is based on the first signal.

2. The article of claim 1, wherein the second generating device further comprises a microprocessor and a data storage means.

3. The article of claim 1, and further wherein the coupling device is at least one lens.

4. The article of claim 1, wherein the first generating device comprises a photodetector.

5. The article of claim 4, wherein the attenuating device is selected from the group consisting of a movable constant reflectivity mirror, a movable wedge prism, and a variable reflectivity mirror.

6. The article of claim 5, wherein the attenuating device is a variable reflectivity mirror comprising a movable layer in spaced and superposed relation to a nonmoving layer, the movable layer having three sublayers:
   a first sublayer proximal to the nonmoving layer, the first sublayer having a first refractive index that is approximately equal to a refractive index of the nonmoving layer and having a first thickness approximately equal to one-half of a wavelength of the optical signal, as measured within the first sublayer;
   a second sublayer disposed on the first sublayer, the second sublayer having a second refractive index that is approximately equal to the square root of the refractive index of the nonmoving layer and a second thickness approximately equal to one-quarter of a wavelength of the optical signal as measured within the second sublayer; and
   a third sublayer disposed on the second sublayer, the second sublayer having a third refractive index that is approximately equal to the refractive index of the substrate and a third thickness approximately equal to one-quarter of a wavelength of the optical signal, as measured in the first layer.

7. The article of claim 1, wherein the attenuating device and the first generating device is a variable absorber/detector.

8. The article of claim 1, wherein the second generating device comprises a linearing device that linearizes the attenuation provided by the attenuating device in response to the second signal.

9. The article of claim 1, and further wherein the attenuating device generates an attenuated signal portion.

10. An article for delivering an optical signal having a predetermined power, comprising:
    a variable attenuator for providing a variable and controlled amount of attenuation to an optical signal having a time-varying power, wherein the variable attenuator generates an unattenuated signal portion, the unattenuated signal portion having the predetermined power;
    a telecentric imaging device operable to couple, to an output fiber, the unattenuated signal portion;
    an optical power detector for generating a first signal indicative of the amount of attenuation provided by the variable attenuator; and
    control electronics that receive the first signal and are operable to generate and to transmit a control signal, based in part on the first signal, for controlling the amount of attenuation provided by the variable attenuator so that the unattenuated signal portion has the predetermined power.

11. The article of claim 10, and further wherein the variable attenuator and the optical power detector are a variable absorber/detector.

12. The article of claim 11, and further wherein the telecentric imaging device comprises:
    a lens that collimates the optical signal having a time-varying power and couples, to the output, the unattenuated signal portion generated by the variable attenuator; and
    a mirror disposed in a Fourier plane of the lens, wherein the mirror reflects any portion of the collimated optical signal incident thereon towards the lens.

13. The article of claim 10, wherein the variable attenuator generates an attenuated signal portion, and further wherein the variable attenuator is configured to direct the attenuated signal portion to the optical power detector.

14. The article of claim 13, wherein the telecentric imaging device comprises a
    a first lens for collimating the optical signal, the first lens having a first focal length and disposed optically upstream of the variable attenuator and optically downstream of an input, wherein, the input is in a focal plane of the first lens; and
    a second lens for coupling the unattenuated signal portion to the output, the second lens having a second focal length and disposed optically downstream of the variable attenuator and optically upstream of the output, wherein, the output is in a focal plane of the second lens, and further wherein
    the first and second lenses are separated from one another by a distance equal to the sum of the first and the second focal lengths.

15. The article of claim 13, wherein the telecentric imaging device comprises
   a lens that collimates the optical signal having a time-varying power and couples, to the output, the unattenuated signal portion generated by the variable attenuator; and
   a mirror disposed in a Fourier plane of the lens, wherein the mirror reflects the collimated optical signal, or any portion thereof incident thereon, towards the lens.

16. The article of claim 15, wherein the mirror is a variable reflectivity mirror.

17. The article of claim 16, wherein the means for attenuating is a variable reflectivity mirror comprising a movable layer in spaced and superposed relation to a nonmoving layer, the movable layer having three sublayers:
   a first sublayer proximal to the nonmoving layer, the first sublayer having a first refractive index that is approximately equal to a refractive index of the nonmoving layer and having a first thickness approximately equal to one-half of a wavelength of the optical signal, as measured within the first sublayer;
   a second sublayer disposed on the first sublayer, the second sublayer having a second refractive index that is approximately equal to the square root of the refractive index of the nonmoving layer and a second thickness approximately equal to one-quarter of a wavelength of the optical signal as measured within the second sublayer; and
   a third sublayer disposed on the second sublayer, the second sublayer having a third refractive index that is approximately equal to the refractive index of the substrate and a third thickness approximately equal to one-quarter of a wavelength of the optical signal, as measured in the first layer.

18. The article of claim 13, wherein the optically power detector is disposed optical downstream of the variable attenuator.

19. The article of claim 14, wherein the optical power detector is attached to the variable attenuator.

20. The article of claim 19, wherein the optical power detector is attached to, and shares a common substrate with, the variable attenuator.

21. A method for providing an output optical signal having a controlled predetermined optical power, comprising the steps of:
   attenuating, by a controlled variable amount, the power of an input optical signal having a time-varying power by separating the input optical signal into an attenuated signal portion and the output optical signal;
   coupling the output optical signal to an output;
   generating a first signal indicative of the amount of power attenuation;
   generating a second signal for controlling the variable amount of power attenuation so that the output optical signal has said predetermined power, wherein the second signal is based on the first signal.

22. The method of claim 21, wherein the step of attenuating further comprises the step of generating an attenuated signal portion.

23. The method of claim 22, wherein the step of attenuating further comprises the step of directing the attenuated signal portion to an optical power detector.

24. The method of claim 23, wherein the step of generating a first signal indicative of the amount of attenuation further comprises the steps of exposing the optical power detector to the attenuated signal portion.

25. The method of claim 24, wherein the step of generating a second signal further comprises the step of determining the power of the optical signal having the time-varying power.

26. The method of claim 25, wherein the step of generating a second signal further comprises the step of generating the second signal based on a value retrieved from a look-up table.

27. The method of claim 25, wherein the step of generating a second signal further comprises the step of generating the second signal based on a value calculated using an optical transfer function.

28. An article for attenuating an optical signal, comprising:
   a variable attenuator for providing a variable and controllable amount of attenuation to an optical signal having a time-varying power, the attenuator operable to generate an unattenuated signal portion, the unattenuated signal portion having a predetermined power;
   a telecentric imaging device for delivering the optical signal to the variable attenuator in a collimated state and operable to couple the unattenuated signal portion to an output; and
   an optical power detector for measuring the amount of attenuation provided by the attenuator.

* * * * *